United States Patent
Takehara

(10) Patent No.: US 9,620,990 B2
(45) Date of Patent: Apr. 11, 2017

(54) ELECTRICITY SUPPLY MANAGEMENT DEVICE

(75) Inventor: Kiyotaka Takehara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 721 days.

(21) Appl. No.: 13/500,120

(22) PCT Filed: Oct. 1, 2010

(86) PCT No.: PCT/IB2010/002495
§ 371 (c)(1),
(2), (4) Date: May 8, 2012

(87) PCT Pub. No.: WO2011/042788
PCT Pub. Date: Apr. 14, 2011

(65) Prior Publication Data
US 2012/0212050 A1    Aug. 23, 2012

(30) Foreign Application Priority Data

Oct. 5, 2009 (JP) ................................ 2009-232008

(51) Int. Cl.
*H02J 1/10* (2006.01)
*H02J 7/35* (2006.01)
(Continued)

(52) U.S. Cl.
CPC ........ *H02J 7/35* (2013.01); *H02J 3/14* (2013.01); *H02J 3/32* (2013.01); *H02J 3/383* (2013.01);
(Continued)

(58) Field of Classification Search
CPC ...................................................... H02J 1/10
(Continued)

(56) References Cited

U.S. PATENT DOCUMENTS 4,742,291 A * 5/1988 Bobier ...................... H02J 7/35
136/293
2004/0232878 A1* 11/2004 Couch ....................... H02J 1/14
320/101
(Continued)

FOREIGN PATENT DOCUMENTS

EP    2065996    6/2009
GB    2457506    8/2009
(Continued)

OTHER PUBLICATIONS

International Search Report for corresponding International Application No. PCT/IB2010/002495mailed Feb. 15, 2011.
(Continued)

*Primary Examiner* — Jared Fureman
*Assistant Examiner* — Joseph Inge
(74) *Attorney, Agent, or Firm* — Renner, Otto, Boisselle & Sklar, LLP

(57) ABSTRACT

An electricity supply management device includes a solar cell; a commercial Alternating Current (AC) power source; and a storage battery, in which the storage battery is charged by an electric power from the solar cell, and a power from at least one of the solar cell, the commercial AC power source and the storage battery is supplied to one or more load devices. A power consumption level by the load devices is controlled based on comparison result between a power generation amount by the solar cell and a power consumption amount by the load devices, and a charge level of the storage battery indicative of a ratio of charging to capacity of the storage battery.

10 Claims, 6 Drawing Sheets

(51) Int. Cl.
*H02J 3/32* (2006.01)
*H02J 3/38* (2006.01)
*H02J 3/14* (2006.01)

(52) U.S. Cl.
CPC .......... *Y02B 10/14* (2013.01); *Y02B 70/3225* (2013.01); *Y02E 10/563* (2013.01); *Y02E 10/566* (2013.01); *Y02E 70/30* (2013.01); *Y04S 20/222* (2013.01); *Y10T 307/336* (2015.04)

(58) Field of Classification Search
USPC .......................................................... 307/29
See application file for complete search history.

(56) References Cited

U.S. PATENT DOCUMENTS

| | | | | |
|---|---|---|---|---|
| 2009/0072779 | A1* | 3/2009 | Kuhlmann | H02J 7/35 320/101 |
| 2010/0207448 | A1* | 8/2010 | Cooper | H02J 3/14 307/20 |
| 2011/0307113 | A1* | 12/2011 | Kumar | B60M 3/00 700/291 |

FOREIGN PATENT DOCUMENTS

| | | | |
|---|---|---|---|
| JP | 10285825 A | * | 10/1998 |
| JP | H10-285825 | | 10/1998 |
| JP | 2003-32890 | | 1/2003 |
| JP | 2004-23879 | | 1/2004 |
| JP | 2007-295680 | | 11/2007 |
| JP | 2008-86109 | | 4/2008 |
| JP | 2011050133 A | * | 3/2011 |

OTHER PUBLICATIONS

Form PCT/ISA/237 for corresponding International Application No. PCT/IB2010/002495 dated Feb. 15, 2011.
Extended European Search Report dated Jun. 29, 2015 issued in corresponding European Patent Application No. 10821645.8.
European Office Action dated Apr. 20, 2016 issued in corresponding European Patent Application No. 10821645.8.

* cited by examiner (A) SOLAR POWER GENERATION AMOUNT AND DC POWER USAGE AMOUNT (B) CHARGING AMOUNT (C) COMMERCIAL POWER USAGE AMOUNT (D) PERCENTAGE OF USE POWER LIMITATION

| CUT OF 30% (THIRD LEVEL) | NO LIMITATION | CUT OF 20% (SECOND LEVEL) | CUT OF 30% (THIRD LEVEL) | t1　　　　t2　　t3　　　　　　　　t5　　t6

CUT OF 10% (FIRST LEVEL)

(E) POWER CONSUMPTION AMOUNT

ELECTRICITY SUPPLY MANAGEMENT DEVICE

FIELD OF THE INVENTION

The present invention relates to an electricity supply management device, including a solar cell, a commercial AC power source and a storage battery, and charging the storage battery with the power from the solar cell and supplying the power from at least one of the solar cell, the commercial AC power source and the storage battery to one or more load devices.

BACKGROUND OF THE INVENTION

An electricity supply management device has been known, in which a solar cell and a storage battery are combined. The electricity supply management device generates an electric power by using the solar cell during the daytime, supplies some of the generated power to one or more electric devices, supplies a surplus power to the storage battery to thereby charge the storage battery with the surplus power. During the nighttime, an electric power is discharged from the storage battery to be supplied to one or more electric devices (for example, Japanese Patent Application Publication No. 2004-023879).

Meanwhile, it is desired that solar energy is effectively used such that a power consumption by a load device is automatically and optimally adjusted to save the energy. In the meantime, in a conventional electricity supply management device, when the power consumption amount by a load device in a home exceeds the amount of solar power generated, a deficit in power is supplemented for by the power from a commercial AC power source. Accordingly, improvements are required to meet the above-described desires.

SUMMARY OF THE INVENTION

In view of the above, the present invention provides an electricity supply management device that is capable of automatically and optimally controlling the power consumption by a load device based on the amount of an electric power generated by a solar cell and the charge level of a storage battery.

Units for accomplishing the above object and the advantages thereof will be described below.

In accordance with an aspect of the present invention, there is provided an electricity supply management device, including a solar cell; a commercial Alternating Current (AC) power source; and a storage battery, in which the storage battery is charged by an electric power from the solar cell, and a power from at least one of the solar cell, the commercial AC power source and the battery is supplied to one or more load devices. A power consumption level by the load devices is controlled based on comparison result between a power generation amount by the solar cell and a power consumption amount by the load devices, and a charge level of the storage battery indicative of a ratio of charging to capacity of the battery.

With the configuration, the power consumption by the load devices is controlled based on the amount of surplus power, which is obtained by comparing the amount of power generated by the solar cell with the amount of power consumed by the load devices, and the charge level of the battery, which is charged by the power generated by the solar cell. That is, the power consumption by the load devices is limited based on the state of the generation and storage of solar energy, so that the power consumption amount can be automatically and optimally controlled.

An electric power from the solar cell, in preference to an electric power from the commercial AC power source, may be supplied to the load devices and the storage battery. When the power generation amount by the solar cell is larger than the power consumption amount by the load devices and the charge level of the storage battery is equal to or lower than a reference charge level, power consumption by the load devices may be limited not to exceed a preset power level.

With the configuration, when the power generation amount by the solar cells is smaller than the amount of power consumed by the load devices, the power from the solar cells is supplied to the load devices. When the power generation amount by the solar cells is larger than the power consumption amount by the load devices, the power is supplied from the solar cells to the load devices and the storage battery. When the charge level of the storage battery is lower than the reference charge level, the power consumption by the load devices is limited to the preset power level. Accordingly, the power consumption amount by the load devices can be automatically and optimally reduced. As a result, the use of the power from the commercial AC power source can be suppressed.

When the power generation amount by the solar cell is larger than the power consumption amount by the load devices and the charge level of the storage battery is higher than the reference charge level, no limitation may be imposed on the power consumption by the load devices.

With this configuration, when the power generation amount by the solar cells is larger than the power consumption by the DC devices and the charge level of the storage battery is higher than the reference charge level, that is, when the power consumption by the DC devices can be afforded by the power from the solar cells and the storage battery, it is prohibited to impose a limitation on the power consumption by the DC devices. Accordingly, even when the power from the commercial power source is not used, the performance of the load devices can be maintained.

When the power generation amount by the solar cells is equal to or smaller than the amount of power consumption by the load devices and the charge level of the storage battery is higher than the reference charge level, the power consumption by the load devices may be limited not to exceed a reference power level lower than the preset power level.

With the configuration, when the power generation amount by the solar cells is equal to or smaller than the power consumption amount by the load devices and the charge level of the storage battery is higher than the reference charge level, that is, when it is expected that the power consumption amount of the power from the storage battery will be increased, the power consumption by the load devices is limited to the reference power level lower than the preset power level. Accordingly, an excessive reduction in the charge level of the storage battery can be suppressed. Furthermore, since the reference power level lower than the preset power level is used as the limiting level, the suppression of a reduction in the charge level can be ensured.

When the power generation amount by the solar cells is equal to or lower than the power consumption amount by the load devices and the charge level of the storage battery is equal to or lower than the reference charge level, the power consumption by the load devices may be limited not to exceed a backup power level lower than the reference power level.

With the configuration, when the power generation amount by the solar cells is equal to or smaller than the power consumption amount by the load devices and the charge level of the storage battery is equal to or lower than the reference charge level, that is, when it is expected that the power consumption amount from the storage battery will be increased, the power consumption by the load devices is limited not to exceed the backup power level lower than the reference power level. Accordingly, an excessive reduction in the charge level of the storage battery can be suppressed.

Furthermore, since the backup power level lower than the reference power level is used as the limiting level, the suppression of a reduction in the charge level can be ensured.

The reference charge level may be set to a level corresponding to an amount of power consumed by the load devices.

With the configuration, when the charge level of the storage battery is equal to or lower than the level corresponding to the amount of power consumed by the load devices during the nighttime, an excessive reduction in the charge level to below the level corresponding to the amount of power consumed during the nighttime can be suppressed in order to limit the power consumption by the load devices to the preset power level.

When a normal time span during which the electricity rate is normal and a low-rate time span during which the electricity rate is lower than the normal power rate are set as time spans based on which electricity rate of the power from the commercial AC power source is determined, a level corresponding to an amount of power obtained by subtracting an amount of power consumed during the low-rate time span from an amount of power consumed by the load devices during the nighttime may be set as the reference charge level.

With the configuration, the level corresponding to the amount of power obtained by subtracting the amount of low-rate power during the low-rate time span from the amount of power consumed by the load devices is set as the reference charge level, so that the reference charge level is lower than that in the case where the level corresponding to the amount of power consumed by the load devices during the nighttime is set as the reference charge level. Accordingly, in order to decrease the frequency at which the charge level of the storage battery drops below the reference charge level, the frequency at which the power consumption by the load devices is limited not to exceed the first power level can be reduced.

When a time at which the power consumption by the load devices is controlled falls within the low-rate time span, the limiting level of the power consumption by the load devices may be made less stringent compared to the limiting level of the power consumption by the load devices in a time span other than the low-rate time span.

With the configuration, the limitation to power consumption during the low-rate time span is mitigated, which increases the power consumption by the load devices, compared to the case where there is no mitigation of the limitation for the same time span. In this case, the power is supplied to the load devices from the commercial AC power source and the storage battery, and the frequency of using the power supply of the commercial AC power source can be increased. Accordingly, limitation on the use of the load devices during the nighttime at relatively low power rate can be mitigated.

In accordance with the aspect of the present invention, it is possible to provide an electricity supply management device that is capable of suppressing the use of the electric power from a commercial AC power source.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
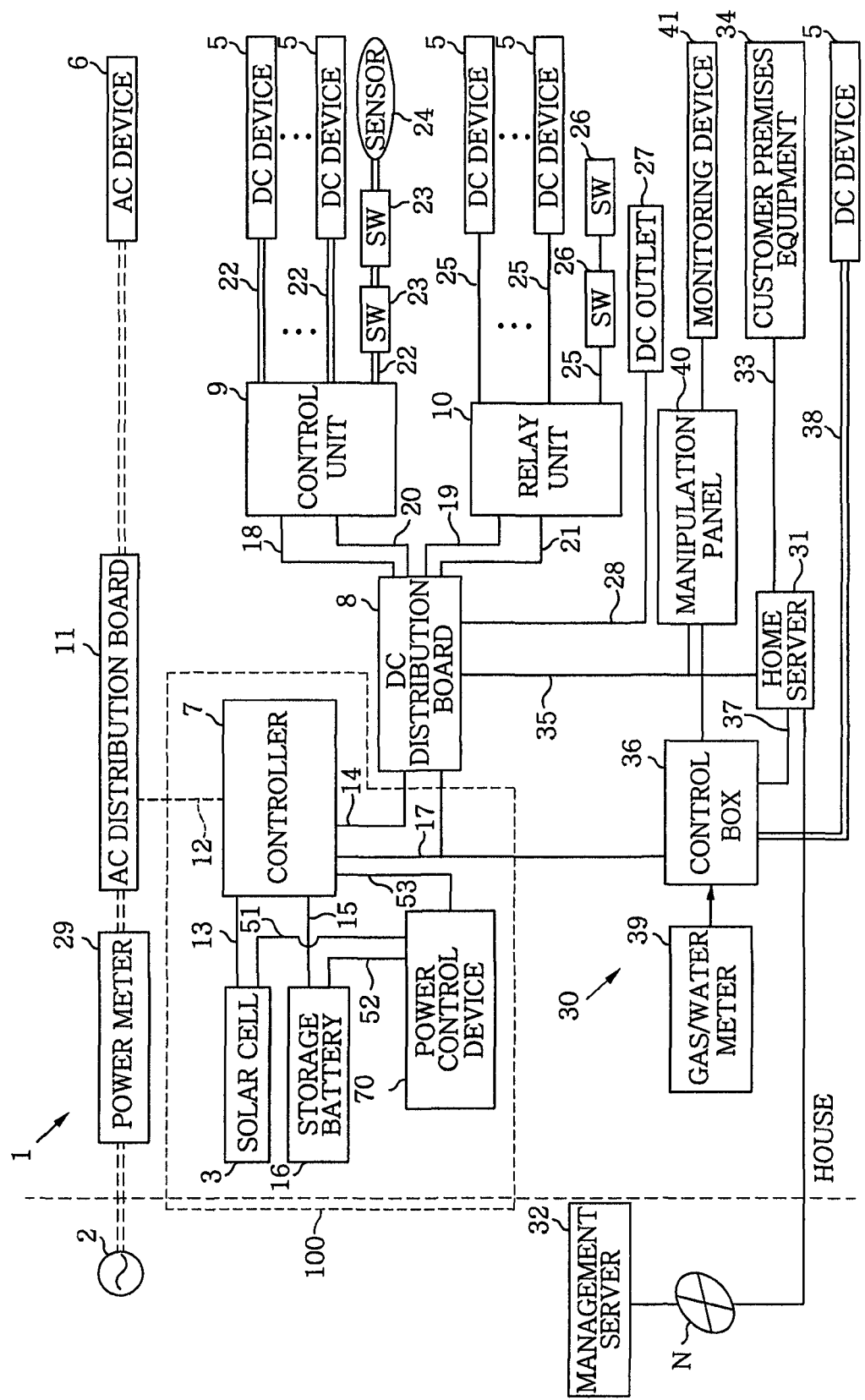
FIG. 1 is a block diagram illustrating a configuration of an electricity supply system including an electricity supply management in accordance with an embodiment of the present invention.

An embodiment of the present invention will be described in detail below with reference to the accompanying drawings which form a part hereof. Same reference numerals will be assigned to same or similar components throughout the drawings, and redundant descriptions thereof will be omitted.

Referring to FIGS. 1 to 6, an embodiment of the present invention will be described. Furthermore, the present embodiment illustrates the case where the electricity supply management device of the present invention is practiced as a part of an electricity supply system.

As shown in FIG. 1, a house is provided with an electricity supply system 1 that supplies an electric power to various types of household devices (a lighting device, an air conditioner, household electronic appliances, audio and visual devices, and the like). The electricity supply system 1 supplies to a variety of types of devices an electric power from a household commercial AC power source (AC power source) 2 and an electric power from a solar cell 3, using solar light.

The electricity supply system 1 supplies an electric power not only to DC devices 5 but also to an AC device 6. Each of the DC devices 5 is operated by a DC electric power, and the AC device 6 is operated by an AC electric power from the commercial AC power source 2. Although, in the following descriptions of the embodiment, the house is given as an example of a place where the electricity supply system 1 is installed, the place is not limited thereto. Alternatively, the electricity supply system 1 may be installed and used in a multi-family house, an apartment, an office, or a factory.

As a distribution board of the electricity supply system 1, a controller 7 and a DC distribution board 8 (including a DC breaker) are provided in the electricity supply system 1. Furthermore, in the electricity supply system 1, a control unit 9 and a relay unit 10 are provided as a device for controlling the operation of the DC devices 5 in the house.

An AC distribution board 11 for branching an AC power is connected to the controller 7 through an AC power line 12. The controller 7 is connected to the commercial AC power source 2 via the AC distribution board 11, and is connected to the solar cell 3 through a DC power line 13. The controller 7 receives an AC power from the AC distribution board 11, receives a DC power from the solar cell 3, and converts the powers into a predetermined DC power as a power for the devices Furthermore, the controller 7 outputs the resulting DC power to the DC distribution board 8 through a DC power line 14 and to a storage battery 16 through a DC power line 15. The controller 7 receives the AC power, converts the DC power from the solar cell 3 or the storage battery 16 into an AC power, and supplies the AC power to the AC distribution board 11. The controller 7 exchanges data with the DC distribution board 8 through a signal line 17.

The DC distribution board 8 is a kind of DC power breaker. The DC distribution board 8 branches the DC power inputted from the controller 7, and outputs the resulting DC power to the control unit 9 through a DC power line 18, or to the DC relay unit 10 through a power line 19. Furthermore, the DC distribution board 8 exchanges data with the control unit 9 through a signal line 20, or with the relay unit 10 through a signal line 21.

The plural DC devices 5 are connected to the control unit 9 through DC supply lines 22 each of which is capable of carrying both DC power and data. A communications signal, carrying data by using a high frequency carrier wave, is superimposed on a DC voltage supplied as a power to the DC device 5 through the DC supply line 22. That is, both power and data are carried to the DC device by means of the power line carrier communications through the DC supply line 22 that has a pair of wires. The control unit 9 obtains the DC power for the DC devices 5 through the DC power line 18, and determines an operation control state of the DC devices 5 based on an operating instruction obtained from the DC distribution board 8 through the signal line 20. Furthermore, the control unit 9 outputs the DC power and the operating instruction to the corresponding DC device 5 through the corresponding DC supply line 22, and controls the operation of the DC device 5.

Switches (SW) 23 are connected to the control unit 9 through the DC supply line 22. The switches 23 are manipulated when the operations of the DC devices 5 are switched. Furthermore, a sensor 24 for detecting, for example, radio waves transmitted from an infrared remote control is connected to the control unit 9 through the DC supply line 22. Accordingly, the DC devices 5 are controlled by communications signals transmitted thereto through the DC supply line 22 in response not only to an operating instruction from the DC distribution board 8 but also to the manipulation of the switches 23 or the detection of the sensor 24.

Some of the DC devices 5 are connected to the relay unit 10 through respective DC power lines 25. The relay unit 10 obtains the DC power for the DC devices 5 through the DC power line 19, and determines which one of the DC devices 5 is to be operated based on an operating instruction obtained from the DC distribution board 8 through the signal line 21. Furthermore, the relay unit 10 controls the operation of the determined DC device 5 by selectively turning on and off the supply of power through the DC power line 25 by a relay provided therein. Furthermore, a plurality of switches 26 for manually manipulating the DC devices 5 are connected to the relay unit 10, and the DC devices 5 are controlled by selectively turning on and off the supply of power thereto through the DC power line 25 by the relay in response to the manipulations of the switches 26.

A DC outlet 27 that is uprightly attachable to the house, for example, in the form of a wall outlet or a bottom outlet, is connected to the DC distribution board 8 through the DC power line 28. By inserting the plug (not shown) from the DC device into the DC outlet 27, a DC power can be directly supplied to the DC device.

Furthermore, a power meter 29 capable of remotely measuring the amount of power from the commercial AC power source 2 used is connected to the AC distribution board 11. The power meter 29 has not only the function of remotely measuring the amount of commercial power used but also, for example, the function of power line carrier communications and/or wireless communications. The power meter 29 transmits the results of the measurement to an electric power company or the like through the power line carrier communications or wireless communications.

The electricity supply system 1 includes a network system 30 that enables various types of household devices to be controlled through network communications. The network system 30 includes a home server 31 that functions as a control unit of the network system 30. The home server 31 is connected to an external management server 32 through a network N, such as the Internet, and also to a customer premises equipment 34 through a signal line 33. Furthermore, the home server 31 is operated by a DC power, obtained from the DC distribution board 8 through a DC power line 35.

A control box 36 for managing the operational control of various types of home devices by using network communications is connected to the home server 31 through a signal line 37. The control box 36 is connected to the controller 7 and the DC distribution board 8 through the signal line 17, and also directly controls the DC devices 5 through a DC supply line 38. A gas/water meter 39 capable of remotely measuring, for example, the amount of gas or water used is connected to the control box 36, and a manipulation panel 40 of the network system 30 is also connected to the control box 36. A monitoring device 41 including, for example, a door phone receiver, a sensor and/or a camera is connected to the manipulation panel 40.

When operating instructions from the various types of home devices are inputted to the home server 31 through the network N, the home server 31 notifies the control box 36 of the operating instructions, and operates the control box 36 to control the various types of the home devices to perform operations based on the operating instructions. Furthermore, the home server 31 may provide various types of information, obtained from the gas/water meter 39, to the management server 32 through the network N. When receiving from the manipulation panel 40 a notification that the monitoring device 41 has detected an abnormality, the home server 31 may also provide the notification to the management server 32 through the network N.

The electricity supply management device 100 includes the solar cell 3, the storage battery 16, the controller 7, and a power control device 70. The electricity supply management device 100 limits the power consumption by the DC devices 5 depending on the amount of power generated by the solar cell 3 and the charge level CL of the storage battery 16.

The solar cell 3 periodically measures the solar power generation amount PWS, and outputs the measured solar power generation amount PWS to the power control device 70 through a signal line 51. Furthermore, the solar power generation amount PWS varies depending on both the intensity of solar light and the load connected to the solar cell 3. For example, even when the solar cell 3 has a sufficiently large capacity to generate a power, if the total amount of DC powers used by the DC devices 5 connected to the solar cell 3 is smaller than the amount of power generated by the solar cell 3, the solar cell 3 may generate the power in proportion to the total power consumption amount of the DC devices 5.

The storage battery 16 is charged or discharged in response to a request from the power control device 70. The storage battery 16 is managed based on two levels, that is, a backup level CLB and a reserve charge level CLA (reference charge level). The backup level CLB is set in such a way that an electric power can be supplied for a predetermined period of time when the supply of power is interrupted in case of emergency such as a power failure in the nighttime or a fire. For example, the backup level CLB is set to a charge level CL in proportion to the amount of power that is used in case of emergency. The storage battery 16 is generally controlled such that the charge amount of the storage battery 16 does not become less than the backup level CLB.

The reserve charge level CLA is set to be a charge level higher than the backup level CLB in order to supply the power to be consumed by the DC devices 5 during the nighttime. For example, the reserve charge level CLA is set to the charge level CL in proportion to the amount of power per night that is consumed by the DC devices 5 during the nighttime. The storage battery 16 periodically measures the charge level CL, and outputs the measured charge level CL to the power control device 70 through a signal line 52.

The controller 7 includes a DC/DC converter that converts an electric power from the solar cell 3 into a low-voltage DC power. By the DC/DC converter, the electric power generated by the solar cell 3 is converted into a power of a predetermined voltage. The controller 7 converts an electric AC power from the commercial AC power source 2 into a DC power or converts the DC power from the solar cell 3 or the storage battery 16 into an electric AC power in response to a request from the power control device 70. For example, when the amount of DC power used by the DC devices 5 (that is, the power consumption amount) is larger than the solar power generation amount PWS by the solar cell 3 and the DC power is insufficient, the AC power is converted into a DC power by the controller 7, thereby compensating for a deficit in the DC power.

Meanwhile, when a DC power usage amount PWD by the DC devices 5 is smaller than the solar power generation amount PWS by the solar cell 3 and an excess of power is generated by the solar cell 3, the remaining DC power is converted into an AC power. The controller 7 measures an AC-DC power amount obtained by converting the AC power into a DC power and a DC-AC power amount obtained by converting the DC power into an AC power, and outputs these measured power amounts to the power control device 70 through the signal line 53.

Figure 2:
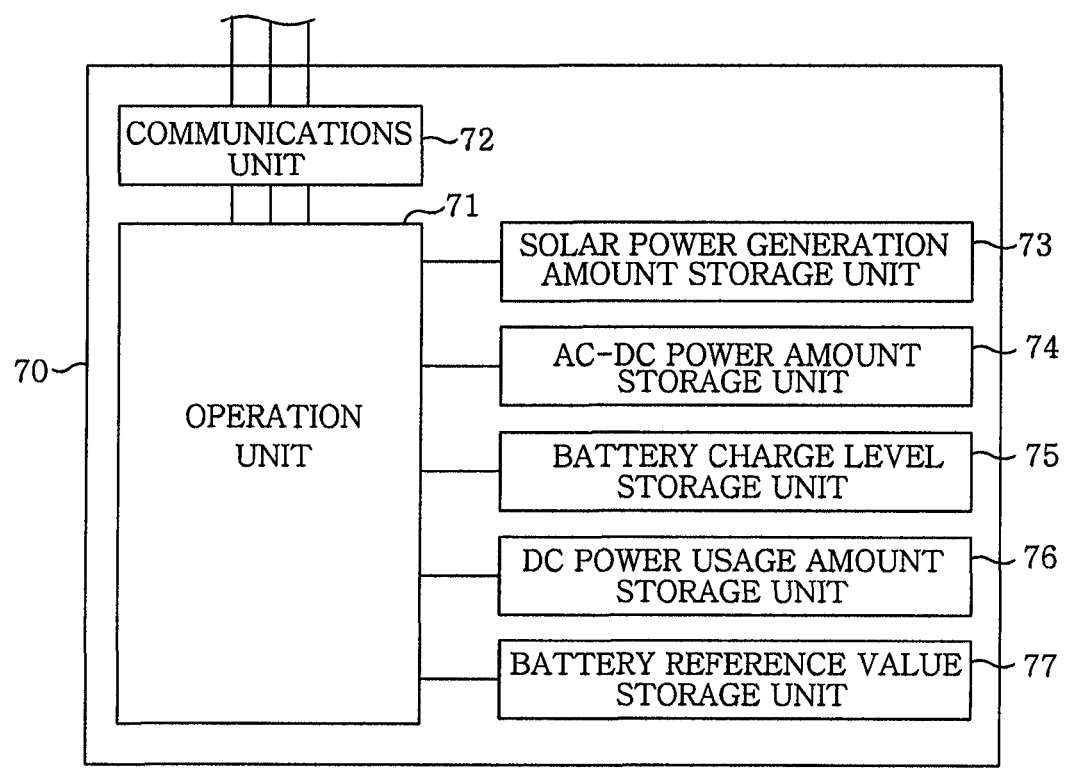
FIG. 2 is a schematic diagram illustrating a configuration of a power control device of the electricity supply management device.

As shown in FIG. 2, the power control device 70 includes an operation unit 71; a communications unit 72 for performing information communications with an external device including the solar cell 3, the controller 7 and the storage battery 16; a solar power generation amount storage unit 73; a AC-DC power amount storage unit 74; a battery charge level storage unit 75; a DC power usage amount storage unit 76; and a battery reference value storage unit 77.

The communications unit 72 receives information such as the solar power generation amount PWS, the charge level CL, the AC-DC power amount, and the DC-AC power amount outputted from the solar cell 3, the storage battery 16 and the controller 7 through the signal lines 51-53. In addition, the communications unit 72 outputs the information to the operation unit 71. Furthermore, the communications unit 72 transmits operating instructions, transmitted from the operation unit 71, to the solar cell 3, the storage battery 16 and the controller 7.

The operation unit 71 creates a power generation change data DTA having the solar power generation amount PWS therein. The power generation change data DTA has the time when a measured solar power generation amount PWS is transmitted and the measured solar power generation amount PWS. Furthermore, the operation unit 71 performs a power control process and a power consumption limitation process. In the power control process, a power supply source is selected for the DC devices 5 depending on the solar power generation amount PWS by the solar cell and the charge level CL of the storage battery. In the power consumption limitation process, the power consumption by the DC devices 5 is limited depending on the power generation amount by the solar cell and the charge level CL of the storage battery.

The solar power generation amount storage unit 73 stores the power generation change data DTA and the total power generation amount DTB per day as a solar power generation data DT. The solar power generation data DT is kept for several years. The AC-DC power amount storage unit 74 stores an AC-DC power amount and an DC-AC power amount. The battery charge level storage unit 75 stores the charge level CL of the storage battery 16. The DC power usage amount storage unit 76 stores the DC power usage amount. The battery reference value storage unit 77 stores the backup level CLB and the reserve charge level CLA.

Figure 3:
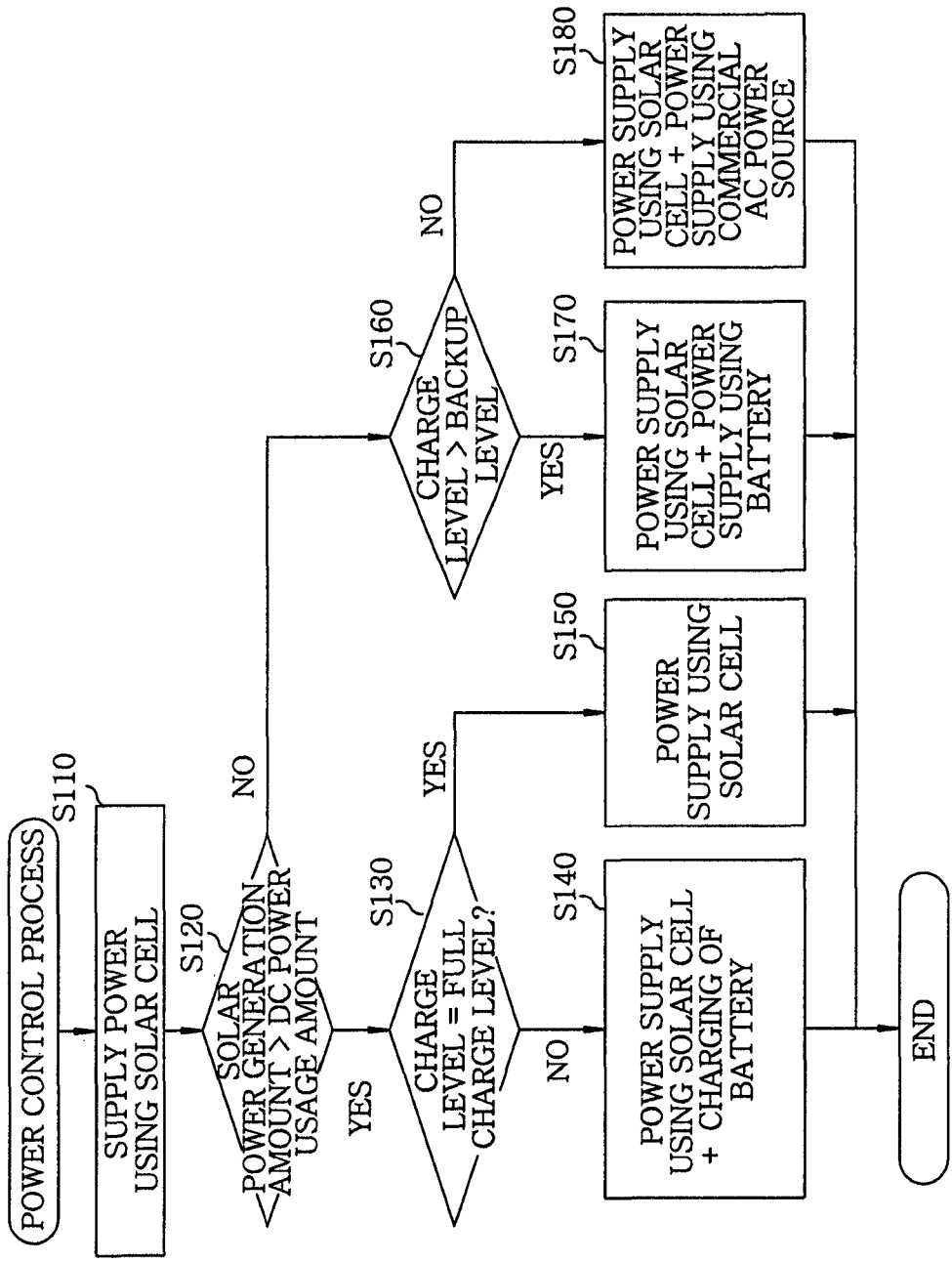
FIG. 3 is a flowchart illustrating a sequence of a power control processing that is performed by the power control device.

Referring to FIG. 3, a sequence of the power control process performed by the power control device 70 will now be described. This process is repeatedly performed by the power control device 70 every predetermined operational period.

At step S110, an electric power of the solar cell 3 may be assigned to the supply of power to the DC devices 5 preferentially. That is, although an electric power is supplied to the DC devices 5 from the commercial AC power source 2 and the solar cell 3, the devices 5 preferentially consume the electric power supplied from the solar cell 3.

At step S120, the solar power generation amount PWS is compared with the DC power usage amount PWD by the DC devices 5. At step S120, if it is determined that the solar power generation amount PWS is larger than the DC power usage amount PWD, that is, if the solar power generation amount PWS is excessive, it is determined whether or not the charge level CL of the storage battery 16 reaches a full charge level CLC at step S130.

If the charge level CL of the storage battery 16 has not reached the full charge level CLC, the power from the solar cell 3 is assigned to the supply of power to the DC devices 5 and the surplus power thereof may be assigned to the charging of the storage battery 16 at step S140. In this case, the solar power generation amount PWS is equivalent to the sum of the DC power usage amount PWD by the DC devices 5 and the charged power amount PWE of the storage battery 16.

Meanwhile, if the charge level CL of the storage battery 16 has reached the full charge level CLC, the power from the solar cell 3 may be assigned to the supply of power to the DC devices 5 and the surplus power thereof is discarded at step S150. In this case, the amount of solar power generation PWS can be made equivalent to the DC power usage amount PWD by the DC devices 5.

If it is determined that the solar power generation amount PWS is smaller than the DC power usage amount PWD at step S120, it is determined whether or not the charge level CL of the storage battery 16 is higher than the backup level CLB at step S160.

If it is determined that the charge level CL of the storage battery 16 is higher than the backup level CLB at step S160, a power is supplied from the storage battery 16 in proportion to a deficit in the DC power usage amount PWD at step S170. In this case, the sum of the solar power generation amount PWS and the supplied power amount PWF from the storage battery 16 becomes equivalent to the DC power usage amount PWD by the DC devices 5.

Meanwhile, if it is determined that the charge level CL of the storage battery 16 is equal to or lower than the backup level CLB, the AC power in proportion to a deficit in the DC power usage amount PWD is converted into a DC power and the DC power is supplied to the DC devices 5 at step S180. In this case, the sum of the solar power generation amount PWS and the AC-DC power amount obtained by converting the AC power into a DC power becomes equivalent to the DC power usage amount PWD by the DC devices 5.

Figure 4:
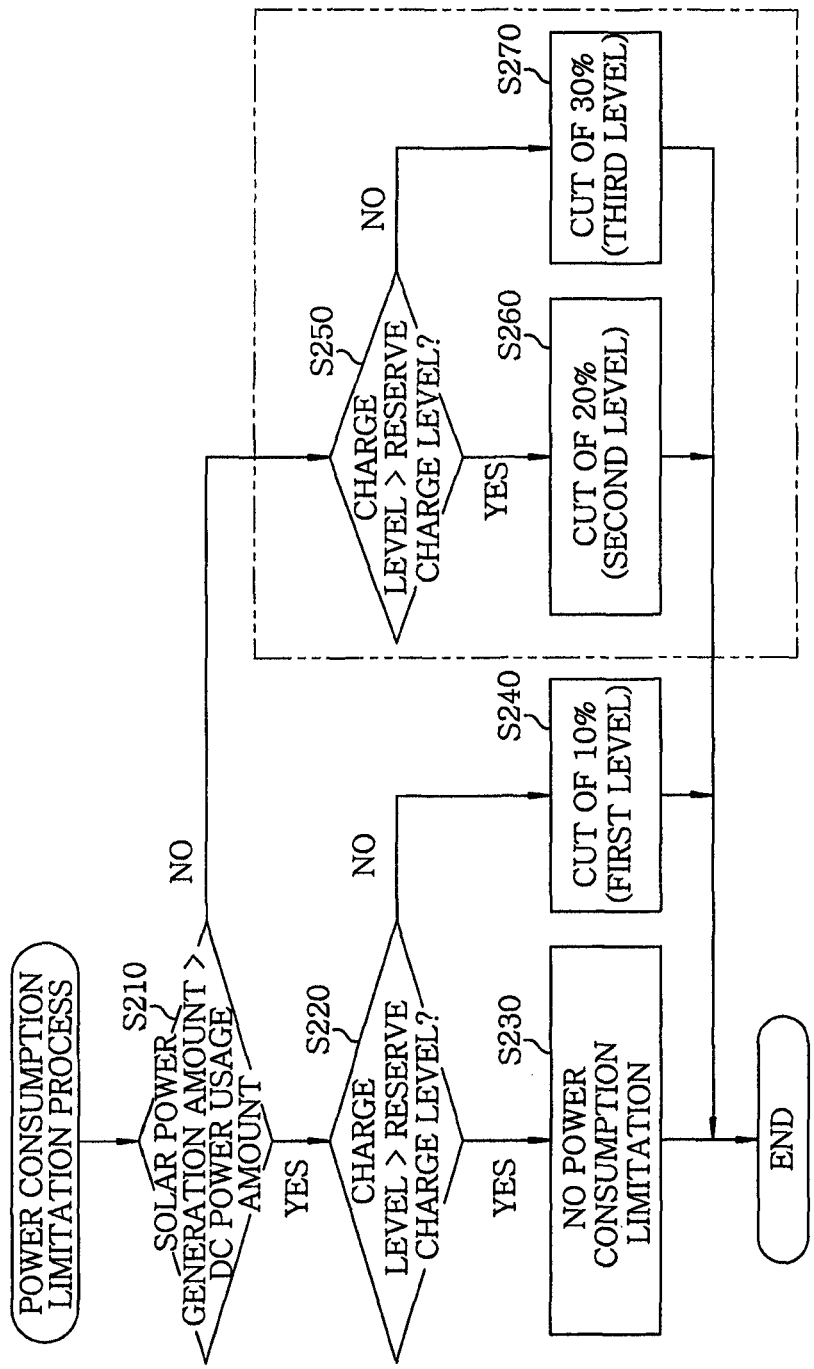
FIG. 4 is a flowchart illustrating a sequence of a power consumption limitation processing that is performed by the power control device.

Referring to FIG. 4, a sequence of the power consumption limitation process performed by the power control device 70 will now be described. Furthermore, this process is repeatedly performed by the power control device 70 every predetermined operational period of time.

At step S210, the solar power generation amount PWS by the solar cell 3 is compared with the DC power usage amount PWD by the DC devices 5. If it is determined that the solar power generation amount PWS is larger than the DC power usage amount PWD at step S210, it is checked to determine whether or not the charge level CL of the storage battery 16 is higher than the reserve charge level CLA at step S220.

If it is determined that the charge level CL of the storage battery 16 is higher than the reserve charge level CLA at step S220, the power consumption by the DC devices 5 is not limited at step S230. That is, since the solar power generation amount PWS is sufficient and the power sufficient for night power consumption has been accumulated in the storage battery 16, the power limitation is not carried out.

On the other hand, if the charge level CL of the storage battery 16 is equal to or lower than the reserve charge level CLA, the power consumption by the DC devices 5 is limited not to exceed a first power level at step S240. For example, the limitation of the power corresponding to the first power level, e.g., 10%, of the total power consumption by all the DC devices 5 is imposed at the time at which the determination is performed at step S220. Specifically, some devices whose use can be limited are selected from all the DC devices 5. Then, one or more devices are specified among the selected devices to enable the total power consumption to be reduced by 10% by cutting off the power supply to the specified DC devices when the power limitation is carried out. Thereafter, when the power consumption limitation processing is performed, the supply of power to the specified DC devices 5 is blocked in response to an operating instruction from the power control device 70 to the relay unit 10 or the control unit 9.

If it is determined that the solar power generation amount PWS is equal to or smaller than the DC power usage amount PWD at step S210, it is checked to determine whether or not the charge level CL is higher than the reserve charge level CLA of the storage battery 16 at step S250.

If the charge level CL of the storage battery 16 is higher than the reserve charge level CLA, the power consumption by the DC devices 5 is limited not to exceed a second power level at step S260. The second power level is set such that the reduction in the power consumption at the second power level is greater than that at the first power level.

Since the DC power usage amount PWD cannot be met by the power from the solar cell 3, it is expected that the charge level CL will become equal to or lower than the reserve charge level CLA after a while. For this reason, a reduction in the charge level CL is mitigated by limiting the power consumption by the DC devices 5 to the second power level at which the extent of limitation is stricter than at the first power level. For example, the limitation of the power corresponding to the second power level, e.g., 20%, of the total power consumption of the DC devices 5 is imposed at the time at which the determination is performed at step S250.

On the other hand, if the charge level CL of the storage battery 16 is equal to or lower than the reserve charge level CLA, the power consumption by the DC devices 5 is limited not to exceed a third power level at which the extent of limitation is stronger than that at the second power level at step S270. That is, since the DC power usage amount PWD cannot be met by the power from the solar cell 3 and the charge level CL is equal to or lower than the reserve charge level CLA, it is expected that the charge level CL will become equal to or lower than the backup level CLB after a while. For this reason, the power consumption by the DC devices 5 is further limited to the third power level which imposes a stricter limitation than the second power level. For example, the power consumption is limited to the third power level, e.g., 30%, of the total power consumption of the DC devices 5 at the time when the determination is performed at step S250.

Figure 5:
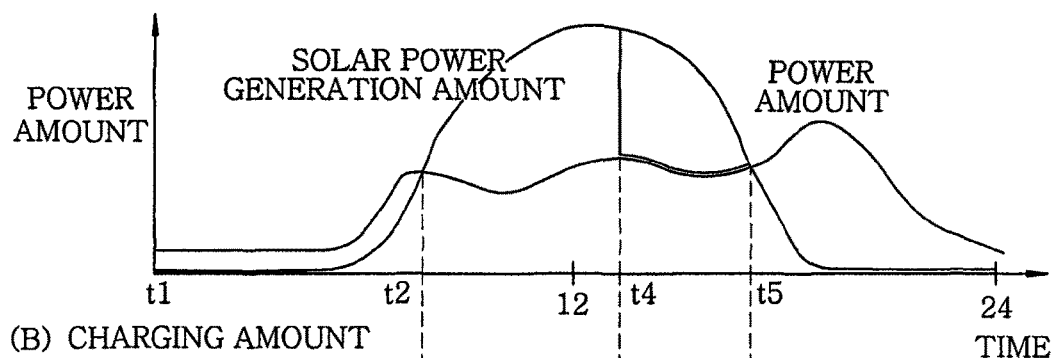
FIG. 5 shows timing charts of examples of a control state of the electricity supply management device of the embodiment.
Figure 5:
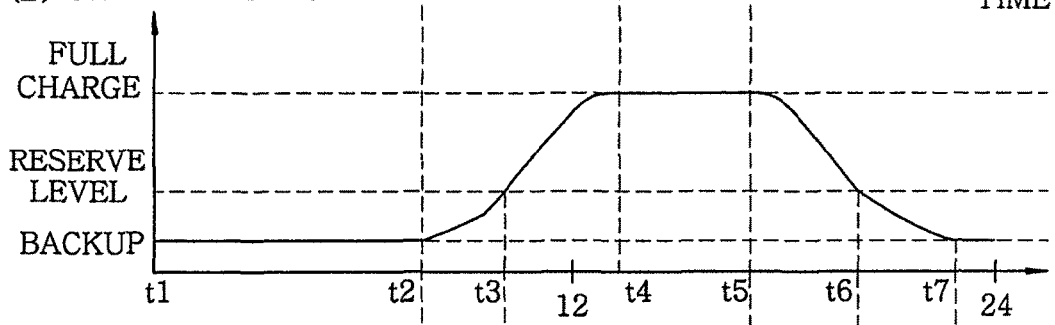
Figure 5:
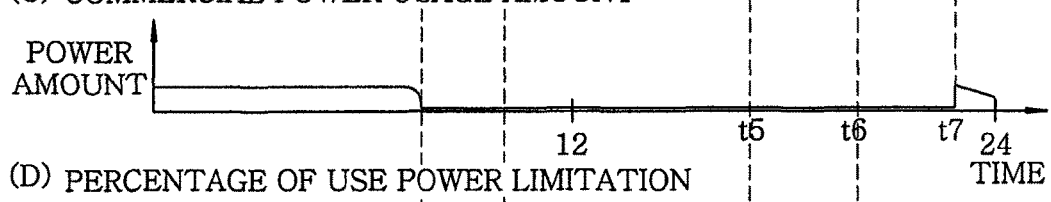
Figure 5:
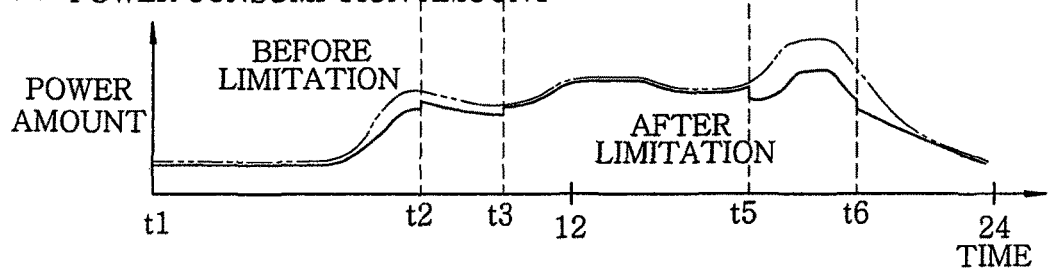

Referring to FIG. 5, an example of the control state of the electricity supply management device will be described.

At time t1, that is, at midnight, if the solar power generation amount PWS is equal to or lower than the DC power usage amount PWD and the charge level CL of the storage battery 16 is equal to or lower than the reserve charge level CLA, the power consumption by the DC devices 5 is limited to the third power level.

Here, since a power is not generated by the solar cell 3 and the standby power of the DC devices 5 is consumed, the DC power usage amount PWD becomes larger than the solar power generation amount PWS. Furthermore, the charge level CL of the storage battery 16 becomes equal to the backup level CLB. The commercial AC power is used to maintain the charge level CL to be the backup level CLB of the storage battery 16. In this case, the power consumption by the DC devices 5 is limited to the third power level. At midnight, the number of DC devices 5 being used is small, and therefore, in practice, the operation of the DC devices 5 is rarely substantially limited.

Thereafter, as the sun rises up, the solar power generation amount PWS is increased. Further, the power consumption by the DC devices 5 is increased. Accordingly, the solar power generation amount PWS starts to be increased from the state in which it is smaller than the DC power usage amount PWD by the DC devices 5 for a while after the generation of the solar cell 3 is started.

At time t2, that is, when the solar power generation amount PWS becomes larger than the DC power usage amount PWD by the DC devices 5 and the charge level CL of the storage battery 16 becomes equal to or lower than the reserve charge level CLA, some of the solar power generation amount PWS becomes excessive, and therefore the storage battery 16 starts to be charged. At this time, the power consumption by the DC devices 5 is limited to the first power level.

At time t3, that is, when the solar power generation amount PWS becomes larger than the DC power usage amount PWD by the DC devices 5 and the charge level CL of the storage battery 16 becomes higher than the reserve charge level CLA, the limitation on the power consumption by the DC devices 5 is released. In this case, all the DC devices 5 can be operated.

At time t4, that is, when the charge level CL of the storage battery 16 reaches the full charge level CLC, the solar power generation amount PWS becomes identical to the total power consumption amount by the DC devices 5. That is, it is estimated that the solar cell 3 generates an electric power whose curve is drawn along the two-dot chain line as shown in FIG. 5(A). Meanwhile, since the total power consumption amount by the DC devices 5 connected to the solar cell 3 is smaller than the solar power generation amount PWS, the actual solar power generation amount PWS becomes a value appropriate for the load of the DC devices 5. In this case, it is concluded that the power obtained by subtracting the actual solar power generation amount PWS from the potential solar power generation amount PWS is discharged.

Thereafter, as the sun goes down, the solar power generation amount PWS is gradually decreased. While the solar power generation amount PWS is larger than the DC power usage amount PWD, the DC devices 5 are powered from the solar cell 3. Accordingly, a power is not supplied from the storage battery 16. For this reason, the charge level CL of the storage battery 16 remains at the full charge level CLC while the solar power generation amount PWS is larger than the DC power usage amount PWD.

At time t5, that is, when the solar power generation amount PWS becomes smaller than the DC power usage amount PWD by the DC devices 5, the power from the solar cell 3 to be supplied to the DC devices 5 is insufficient, and therefore the power starts to be supplied from the storage battery 16. Meanwhile, the power consumption by the DC devices 5 is limited to the second power level. Since the supply of power from the storage battery 16 is suppressed compared to the case where there is no limitation, a reduction in the charge level CL of the storage battery 16 is suppressed.

Thereafter, the solar power generation amount PWS becomes decreased, and the charge level CL of the storage battery 16 also becomes reduced.

Furthermore, since the solar cell 3 generates no power during the nighttime, the power is further supplied from the storage battery 16.

At time t6, that is, when the solar power generation amount PWS becomes smaller than the DC power usage amount PWD by the DC devices 5 and the charge level CL of the storage battery 16 becomes equal to or lower than the reserve charge level CLA, the power consumption by the DC devices 5 is limited to the third power level.

That is, at this time, the amount of power generated by the solar cell 3 becomes smaller than the DC power usage amount PWD by the DC devices 5 and the charge level CL of the storage battery 16 becomes equal to or lower than the reserve charge level CLA, and therefore the limitation degree on the power consumption by the DC devices 5 may be increased from the second power level to the third power level.

At time t7, that is, when the charge level CL of the storage battery 16 reaches the backup level CLB, the power is prohibited from being supplied from the storage battery 16. Meanwhile, in order to maintain the charge level CL of the storage battery 16, a deficit in power is compensated for by the power from the commercial AC power source 2.

With the power supply management device 100 of the present embodiment, the following advantages can be achieved.

(1) In the present embodiment, the power consumption level by the DC devices 5 is controlled based on the surplus power amount, which is obtained by comparing the power generation amount by the solar cell 3 with the power consumption amount by the DC devices 5, and the charge level CL of the storage battery 16, which is charged by the power generation by the solar cell 3.

With this configuration, the power consumption amount by the DC devices 5 is limited based on the statuses of the generation and storage of solar energy, so that the power consumption amount thereof can be automatically and optimally controlled.

(2) In the present embodiment, when the power generation amount by the solar cell 3 is larger than the DC power usage amount PWD by the DC devices 5, the power from the solar cell 3 is supplied to the DC devices 5 and the storage battery 16. When the power generation amount by the solar cell 3 is equal to or smaller than the DC power usage amount PWD by the DC device 5, the power from the solar cell 3 is supplied to the DC devices 5. When the power generation amount by the solar cell 3 is larger than the DC power usage amount PWD by the DC devices 5 and the charge level CL of the storage battery 16 is equal to or lower than the reserve charge level CLA, the power consumption by the DC devices 5 is limited not to exceed the first power level.

With this configuration, when the power generation amount by the solar cell 3 is equal to or smaller than the DC power usage amount PWD by the DC devices 5, the power from the solar cell 3 is supplied to the DC devices 5. When the power generation amount by the solar cell 3 is larger than the DC power usage amount PWD by the DC devices 5, the power from the solar cell 3 is supplied to the DC devices 5 and the storage battery 16. When the power generation amount by the solar cell 3 is larger than the DC power usage amount PWD by the DC devices 5 and the charge level CL of the storage battery 16 is equal to or lower than the reserve charge level CLA, the power consumption by the DC devices 5 is limited not to exceed the first power level. Accordingly, the power consumption amount by the DC devices 5 can be automatically and optimally reduced. As a result, the use of power from the commercial AC power source 2 can be suppressed.

(3) In the present embodiment, when the power generation amount by the solar cell 3 is larger than the DC power usage amount PWD by the devices 5 and the charge level CL of the storage battery 16 is higher than the reserve charge level CLA, the power consumption by the DC devices 5 is not limited.

With this configuration, when the power generation amount by the solar cell 3 is larger than the power consumption amount by the DC devices 5 and the charge level CL of the storage battery 16 is higher than the reserve charge level CLA, that is, when the power consumption by the DC devices 5 can be afforded by the powers from the solar cell 3 and the storage battery 16, it is prohibited to impose a limitation to the power consumption by the DC devices 5.

Accordingly, even when the power from the commercial AC power source 2 is not used, the performance of the DC devices 5 can be maintained.

(4) In the present embodiment, when the power generation amount by the solar cell 3 is equal to or smaller than the DC power usage PWD amount by the DC devices 5 and the charge level CL of the storage battery 16 is higher than the reserve charge level CLA, the power consumption by the DC devices 5 is limited not to exceed the second power level stricter than the first power level.

With this configuration, when the power generation amount by the solar cell 3 is lower than the DC power usage amount PWD of the DC devices 5 and the charge level CL of the storage battery 16 is higher than the reserve charge level CLA, that is, when it is expected that the power consumption amount of the power from the storage battery 16 will be increased, the power consumption by the DC devices 5 is limited not to exceed the second power level. Accordingly, an excessive reduction in the charge level CL of the storage battery 16 can be suppressed. Furthermore, since the second power level stricter than the first power level is used as the limiting level, the suppression of a reduction in the charge level CL can be ensured.

(5) In the present embodiment, when the power generation amount by the solar cell 3 is equal to or lower than the DC power usage amount PWD by the DC devices 5 and the charge level CL of the Storage battery 16 is equal to or lower than the reserve charge level CLA, the power consumption by the DC devices 5 is limited not to exceed the third power level stricter than the second power level.

With this configuration, when the power generation amount by the solar cell 3 is equal to or smaller than the DC power usage amount PWD by the DC devices 5 and the charge level CL of the storage battery 16 is equal to or lower than the reserve charge level CLA, that is, when it is expected that the consumption of the power from the storage battery 16 will be increased, the power consumption by the DC devices 5 is limited not to exceed the third power level. Accordingly, an excessive reduction in the charge level CL of the storage battery 16 can be suppressed. Furthermore, since the third power level stricter than the second power level is used as the limiting level, the suppression of a reduction in the charge level CL can be ensured. Furthermore, although the limitation regarding power corresponding to 30% of the total power consumption by the DC devices 5 is imposed as the third power level in the present embodiment, the stopping of the use of the DC devices 5, instead of the limitation, may be performed.

(6) In the present embodiment, the level corresponding to the amount of power consumed by the DC devices 5 during the nighttime is set as the reserve charge level CLA. With this configuration, when the power generation amount by the solar cell 3 is larger than the DC power usage amount PWD by the DC devices 5 and the charge level CL of the storage battery 16 is equal to or lower than the level corresponding to the amount of power consumed by the DC devices 5 during the nighttime, the power consumption by the DC devices 5 is limited not exceed to the first power level, so that an excessive reduction in the charge level CL to below the level corresponding to the power consumption amount during the nighttime can be suppressed.

Other Embodiments

Embodiments of the electricity supply management device of the present invention are not limited to the above-illustrated embodiment, but they may be modified, for example, as described below and then practiced. Furthermore, the following modifications are not applied only to the embodiment, but they may be constructed by combining other modifications.

In the above embodiment, when the power consumption is limited in the power consumption limitation process, the limitation is imposed based on the percentages of the total power consumption amount by the DC devices 5. However, a quantity limitation to the total power consumption amount by the DC devices 5, instead of such limitation, may be imposed. For example, with regard to the total DC power usage amount by the DC devices 5, the power usage may be limited based on a subtraction of 200 W from the maximum amount of DC power usage as the first power level, a subtraction of 400 W as the second power level, and a subtraction of 600 W as the third power level.

Although the reserve charge level CLA is set to the charge level CL corresponding to the amount of power consumed during the nighttime in the above embodiment, such setting may vary depending on the season instead. For example, the reserve charge level CLA in the spring or the fall is set to a lower value than that in the summer or the winter. This set value can be changed by using an interface such as a touch panel.

Furthermore, the reserve charge level CLA is not necessarily set based on only the amount of power consumed during the nighttime, and may be set in light of the maximum capacity of the storage battery 16. For example, when the capacity of the storage battery 16 is sufficiently larger than the power usage amount by the DC devices 5 during the nighttime, the reserve charge level CLA is set to a level higher than the amount of power consumed during the nighttime. By such setting, the frequency at which the power is supplied from the commercial AC power source 2 when the power is insufficient during the nighttime can be suppressed.

Furthermore, when the capacity of the storage battery 16 is smaller than the amount of power consumed during the nighttime, the reserve charge level CLA may be set to a level lower than the amount of power consumed during the nighttime. By such setting, the power consumption by the DC devices 5 can be limited even when the capacity of the storage battery 16 is small.

The reserve charge level CLA is not necessarily set only based on the amount of power consumed during the nighttime, and may be set for a low-rate time span of electricity, as will be described below. That is, the reserve charge level CLA may be set to a level corresponding to the amount of power that is obtained by subtracting the amount of power consumed during a low-rate time span from the amount of power consumed by the DC devices 5.

With this configuration, the power consumption by the DC devices 5 is limited by setting the charge level CL of the storage battery 16 to the level corresponding to the amount of power that is obtained by subtracting the amount of power consumed during a low-rate time span from the amount of power consumed by the DC devices 5. Accordingly, by effectively using the power during the low-rate time span, it is possible to reduce the amount of power that is assignable to the charging of the storage battery 16 among the amount of power generated by the solar cell 3, thereby increasing a power to be supplied to the DC devices 5.

It is sometimes the case that a normal time span during which the electricity rate is normal and a low-rate time span during which the electricity rate is lower than the normal electricity rate are set as time spans based on which electricity rate of the commercial AC power source are determined.

Figure 6:
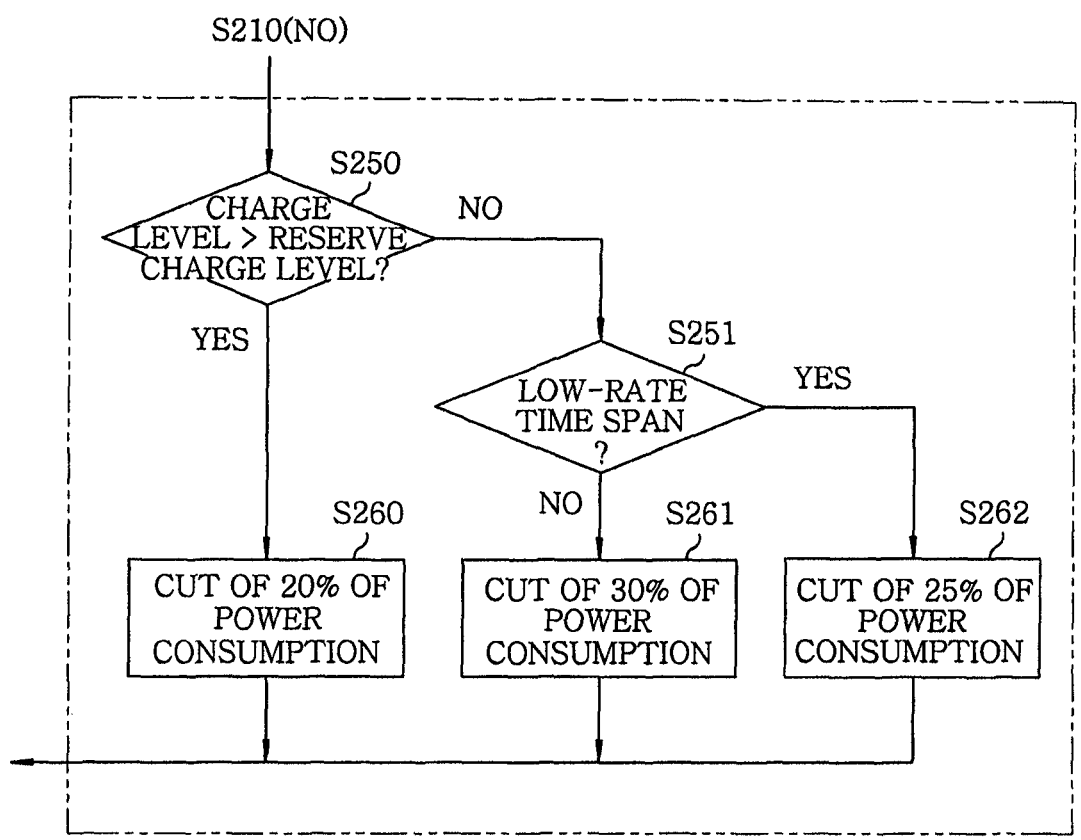
FIG. 6 is a flowchart illustrating a modification of the power consumption limitation processing that is performed by the power control device.

In this case, as shown in FIG. 6, in steps of the power consumption limitation process after step S250, the limiting level may be changed based on whether or not the time at which the corresponding processing is performed falls within the low-rate time span. That is, since the power rate of the commercial AC power source 2 varies depending on the time span, the power from the commercial AC power source 2 can be effectively utilized by changing the extent of the limitation on the amount of power consumed during the low-rate time span. Furthermore, FIG. 6 illustrates a modification of the part surrounded by two-dot chain lines in FIG. 4, with the same reference numerals being assigned to the same steps.

Specifically, the following processing is performed. That is, if the charge level CL of the storage battery 16 is equal to or lower than the reserve charge level CLA at step S250, it is determined whether or not the time (the processing time) at which the processing is performed falls within the low-rate time span at step S251. If the processing time does not fall within the low-rate time span, that is, if the processing time is within the normal-rate time span, the power consumption by the DC devices 5 is limited to the third power level at step S261. That is, since the power rate is normal, the power consumption by the DC devices 5 is limited to a relatively high level.

On the other hand, if the processing time is within the low-rate time span, the power consumption by the DC devices 5 is limited to a level higher than the second power level and lower than the third power level at step S262. That is, since the electricity rate is low, limitation to the power consumption by the DC devices 5 is mitigated from a relatively high level, and therefore the use of the power from the commercial AC power source is promoted. Accordingly, at the relatively low electricity rate, limitation to the use by the DC devices 5 during the nighttime can be mitigated.

In the above embodiment, in the power control process, when the solar power generation amount PWS by the solar cell 3 becomes larger than the DC power usage amount PWD by the DC devices 5 and the storage battery 16 becomes at a full charge level CLC, the surplus power from the solar cell 3 is discarded. In this case, the surplus power may be converted from the DC power into an AC power by the controller 7 and the AC power may be supplied to the AC device 6. When the DC-AC supply control is performed, the controller 7 is considered to be a kind of DC device 5. Here, the amount of power converted from the DC power to the AC power by the controller 7 is treated as the DC power usage amount PWD.

Although, in power control process, the power consumption by one or more specific DC devices 5 is limited in the above embodiment, the power consumption by all the DC devices 5 may be uniformly limited instead. Furthermore, when limitation to a predetermined power level is imposed, one or more specific DC devices 5 are not selected, but priorities may be given to respective DC devices 5 and limitation may be imposed to power consumption in ascending order of priority.

While the invention has been shown and described with respect to the embodiments, it will be understood by those skilled in the art that various changes and modifications may be made without departing from the scope of the invention as defined in the following claims.

What is claimed is:

1. An electricity supply management device comprising:
   a solar cell;
   a storage battery; and
   a power control device,
   wherein the power control device includes:
   an operation unit; and
   a power consumption amount storage unit configured to store a total power consumption amount by a plurality of load devices,
   wherein, in response to a request from the power control device, the storage battery is charged by an electric power from the solar cell, and a power from at least one of the solar cell, the storage battery, and a commercial Alternating Current (AC) power source is supplied to of the load devices,
   wherein the operation unit of the power control device is configured to controls a power consumption level by the load devices based on a comparison result between a power generation amount by the solar cell, the total power consumption amount by the load devices, and a charge level of the storage battery indicative of a ratio of charged amount of the storage battery to capacity of the storage battery, and
   wherein controlling the power consumption level by the load devices includes limiting the total power consumption amount by the load devices by a predetermined fraction thereof so as to not exceed a preset power level.

2. The electricity supply management device of claim 1, wherein an electric power from the solar cell, in preference to an electric power from the commercial AC power source, is supplied to the load devices and the storage battery, and
   when the power generation amount by the solar cell is larger than the total power consumption amount by the load devices and the charge level of the storage battery is equal to or lower than a reference charge level, the total power consumption amount by the load devices is limited not to exceed the preset power level.

3. The electricity supply management device of claim 2, wherein, when the power generation amount by the solar cell is larger than the total power consumption amount by the load devices and the charge level of the storage battery is higher than the reference charge level, no limitation is imposed on the total power consumption amount by the load devices.

4. The electricity supply management device of claim 2, wherein, when the power generation amount by the solar cell is equal to or smaller than the total power consumption amount by the load devices and the charge level of the storage battery is higher than the reference charge level, the total power consumption amount by the load devices is limited not to exceed a reference power level lower than the preset power level.

5. The electricity supply management device of claim 4, wherein, when the power generation amount by the solar cell is equal to or lower than the total power consumption amount by the load devices and the charge level of the storage battery is equal to or lower than the reference charge level, the total power consumption amount by the load devices is limited not to exceed a backup power level lower than the reference power level.

6. The electricity supply management device of claim 2, wherein the reference charge level is set to a level corresponding to a total amount of power consumed by the load devices during the night time.

7. The electricity supply management device of claim 2, wherein, when a normal time span during which the electricity rate is normal and a low-rate time span during which the electricity rate is lower than the normal power rate are set as time spans based on which electricity rate of the power from the commercial AC power source is determined, a level corresponding to an amount of power obtained by subtracting a total amount of power consumed during the low-rate time span from a total amount of power consumed by the load devices in the nighttime is set as the reference charge level.

8. The electricity supply management device of claim 7, wherein, when a time at which the power consumption by the load devices is controlled falls within the low-rate time span, the limiting level of the total power consumption amount by the load devices is made less stringent compared to the limiting level of the total power consumption amount by the load devices in a time span other than the low-rate time span.

9. A power control device for use in an electricity supply management device in which a storage battery is charged by an electric power from a solar cell, and a power from at least one of the solar cell, the storage battery, and a commercial alternating current power source is supplied to a plurality of load device,
    wherein the power control device includes:
    a solar cell;
    an operation unit; and
    a power consumption amount storage unit configured to store a total power consumption amount by the load devices,
    wherein the operation unit of the power control device is configured to control a power consumption level by the load devices based on a comparison result between a power generation amount by the solar cell, a total power consumption amount by the load devices, and a charge level of the storage battery indicative of a ratio of charged amount of the storage battery to capacity of the storage battery, and
    wherein controlling the power consumption level by the load devices includes limiting the total power consumption amount by the load devices by a predetermined fraction thereof so as to not exceed a preset power level.

10. A control method for use in an electricity supply management device in which a storage battery is charged by an electric power from a solar cell, and a power from at least one of the solar cell, a commercial alternating current power source and the storage battery is supplied to a plurality of load devices, the control method comprising:
    obtaining, via a power control device:
    a power generation amount by the solar cell:
    a total power consumption amount by the load devices; and
    a charge level of the storage battery indicative of a ratio of charged amount of the storage battery to capacity of the storage battery;
    and comparing, via an operation unit of the power control device:
    the power generation amount by the solar cell, the total power consumption amount by the load devices, and the charge level of the storage battery; and
    controlling a power consumption level by the load devices based on the result of said comparing,
    wherein controlling the power consumption level by the load devices includes limiting the total power consumption amount by the load devices by a predetermined fraction thereof so as to not exceed a preset power level.

* * * * *